US 8,713,568 B2

(12) United States Patent
Shen et al.

(10) Patent No.: US 8,713,568 B2
(45) Date of Patent: Apr. 29, 2014

(54) SYSTEM AND METHOD FOR DETECTING DEADLOCK IN A MULTITHREAD PROGRAM

(75) Inventors: Zhigang Shen, Nanjing (CN); Feng Tian, Nanjing (CN)

(73) Assignees: Samsung Electronics Co., Ltd., Suwon-si (KR); Samsung Electronics (China) R&D Center, Jiangsu Province Nanjing (CN)

( * ) Notice: Subject to any disclaimer, the term of this patent is extended or adjusted under 35 U.S.C. 154(b) by 323 days.

(21) Appl. No.: 13/077,051

(22) Filed: Mar. 31, 2011

(65) Prior Publication Data

US 2011/0252424 A1    Oct. 13, 2011

(30) Foreign Application Priority Data

Apr. 13, 2010 (CN) .......................... 2010 1 0146519

(51) Int. Cl.
*G06F 9/46* (2006.01)
*G06F 9/44* (2006.01)

(52) U.S. Cl.
USPC .......................................... 718/100; 717/130

(58) Field of Classification Search
None
See application file for complete search history.

(56) References Cited

U.S. PATENT DOCUMENTS

| 6,714,958 | B1 * | 3/2004 | Tudor | 718/100 |
| 7,293,259 | B1 * | 11/2007 | Dmitriev | 717/130 |
| 2002/0156825 | A1 * | 10/2002 | Hoover et al. | 709/105 |

* cited by examiner

*Primary Examiner* — Kenneth Tang
(74) *Attorney, Agent, or Firm* — Sughrue Mion, PLLC

(57) ABSTRACT

A system and method for detecting deadlock in multithread program is provided. The method includes: selecting the thread to be detected; initiating a tracking program to track the thread running in a kernel; initiating a target multithread program; determining whether the selected thread is running; dynamically inserting a probe in the database in order to detect the selected thread through the instrument function. The instrument function records the detected data, and when the recorded data goes beyond the threshold value of the kernel, the data is transmitted to the user space which stores the data, and analyzing the data stored in the user space to judge whether deadlock has been generated. Accordingly, it is possible to detect deadlock efficiently, without the source code of the target program. This is beneficial to a debug task of the multithread and is beneficial to analysis of the usage of the source by the multithread program.

10 Claims, 4 Drawing Sheets

SYSTEM AND METHOD FOR DETECTING DEADLOCK IN A MULTITHREAD PROGRAM

CROSS-REFERENCE TO RELATED APPLICATION

This application claims priority from Chinese Patent Application No. 201010146519.2 filed on Apr. 13, 2010 in the State Intellectual Property Office, the disclosure of which is incorporated herein by reference.

BACKGROUND

1. Field

The exemplary embodiments relate to the computer field. More particularly, the exemplary embodiments relate to a system and method for detecting deadlock in situations involving multitasking.

2. Description of the Related Art

With rapid development of computer techniques, in the current environment, technical applications for multitasking, multithreading or multihandler systems have been widespread. Multitasking refers to one program which has several paths that are concurrently performing. These tasks share the address space of the internal memory and can be performed both concurrently and asynchronously. Deadlock refers to a phenomenon of processes awaiting each other, caused by contending resources, during a procedure of performing two or more processes. If there is no external force, the processes cannot be continued. At such time, the system is referred as being in a state of deadlock. When system deadlock occurs, and the processes that are awaiting each other forever are referred as deadlocked processes. However, since deadlock occurs only in a state such as relating to the interleaving of the threads being performed, or a special condition of a time sequence, it is difficult to detect deadlock.

In a current detection method, processes can be divided as static code analysis and analysis when running. The static code analysis refers to analyzing the target resource program, finding a target thread and related resources, and building the relation map between the thread and the resource. If a cycle occurs, it is deemed a detection of the existence of a deadlock.

The analysis when running, needs to increase extra data structure and the software module. Whenever a thread uses resources (that is, acquires or release resources), it is recorded and analyzed, and if the acquired resource is not identical to the released resource, or the like, it is deemed detection of the existence of a deadlock.

In the related art, the source code of the target program is needed for the detection of deadlock. However, in the situation of joint development of a larger program, less than all of the source codes can be obtained. In the case of a larger amount of source codes, it is difficult to analyze the source codes.

In addition, the current method of dynamic deadlock detection needs to increase the data structure and the software module and will change the action of the target program. For example, when the target program requests resources or releases resources, the target program needs to write a corresponding value into the increased data structure. This will affect the action of the target program, and causes a reduction in the reliability of the obtained result.

SUMMARY

The exemplary embodiments propose to resolve the above problem. The object of the exemplary embodiments is to provide a system and method for detecting deadlock in a multithread program by inserting probes dynamically. As a result, the source code of the target program is not needed and the method has no affect on the running of the target program.

According to this object of the exemplary embodiments, a method for detecting deadlock in the multithread program is provided. The method includes: selecting the thread to be detected; initiating a tracking program to track the thread running in the kernel; initiating a target multithread program; determining whether the selected thread is running; dynamically inserting the probe into the database in order to detect the selected thread through an instrument function; recording the data detected by the instrument function, and when the recorded data goes beyond the threshold value of the kernel, transmitting the data to the user space and storing the data therein; and analyzing the data stored in the user space to make a judgment as to whether a deadlock has been generated.

The manner of detection includes entry detection and return detection, where entry detection is performed when the resource function is entered, and return detection is performed when the resource function is returned.

In the step of recording the data detected by the instrument function, the number of the thread is recorded, as well as the mark of the resource.

In the step of analyzing the data stored in the user space, when one of the plurality of threads requests a resource for a long time and the resource requested by the thread is occupied by another thread and the resource requested by said another thread is occupied by said thread, a judgment is made that deadlock has occurred.

According to another object of the exemplary embodiments, a system for detecting deadlock in a multithread program is provided, including: an instrumentation module for dynamically inserting probes into the database in order to detect the thread, through the instrument function, and recording the data detected by the instrument function; a data transmission module for transmitting and storing the recorded data to the user space when the recorded data goes beyond a threshold value; and an analysis module for analyzing the recorded data which is stored in the user space, in order to make a judgment of whether deadlock has been generated.

The manner of detecting the instrument function includes entry detection and return detection, where the entry detection is performed when the resource function is entered, and the return detection is performed when the resource function is returned.

The instrument function records the number of the thread and the mark of the resource.

When one of the plurality of threads requests a resource for long time and the resource requested by the thread is occupied by another thread and the resource requested by said another thread is occupied by said thread, a judgment is made that deadlock has occurred.

According to the exemplary embodiments, it is possible to efficiently detect deadlock without the source code of the target program. It is therefore beneficial to the debug task of the multithread and the analysis of the usage of the source by the multithread program.

BRIEF DESCRIPTION OF THE DRAWINGS

The above and other objects and features of the exemplary embodiments will become more apparent from the following description, taken in conjunction with the accompanying drawings, in which.

DETAILED DESCRIPTION

The exemplary embodiments will now be described in detail with reference to the accompanying drawings.

Figure 1:
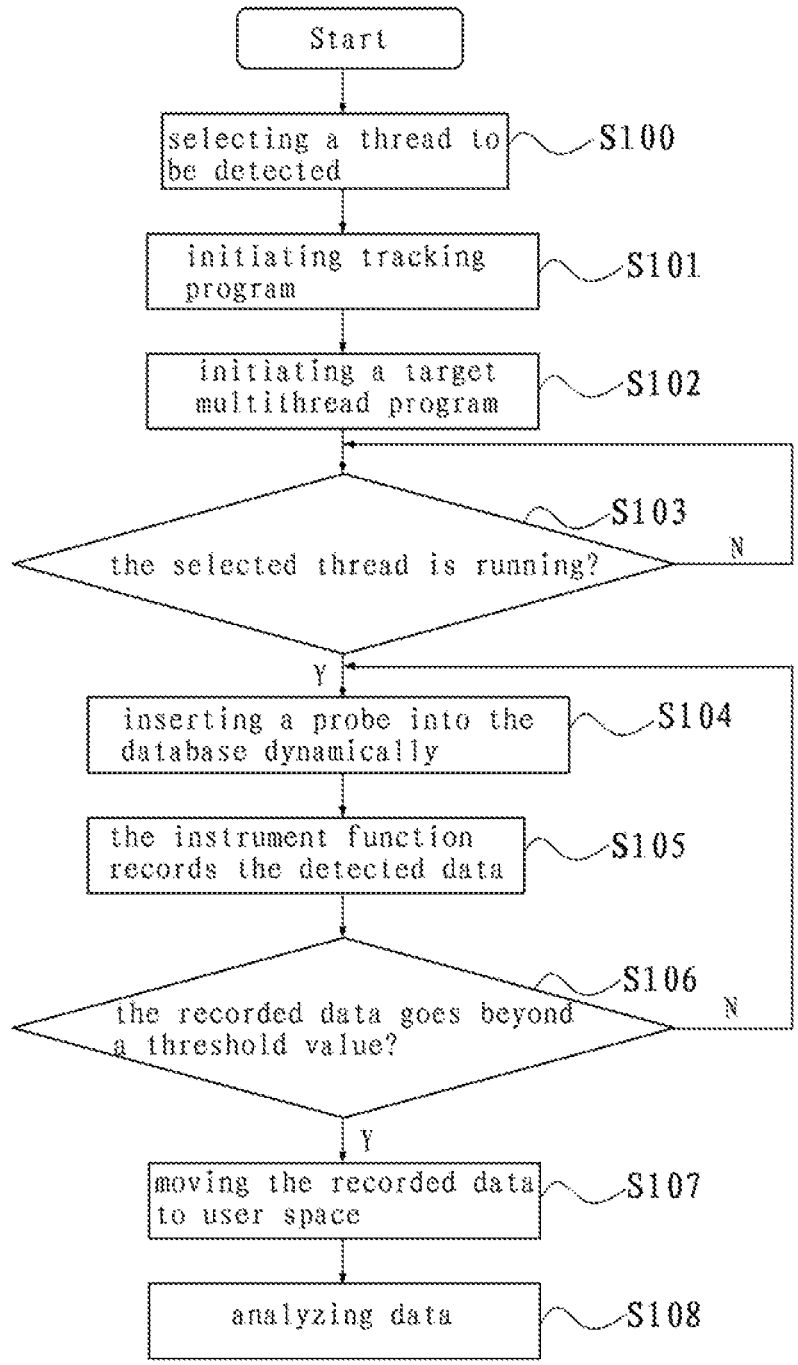
FIG. 1 is a flowchart of a method for detecting deadlock in a multithread program, according to the exemplary embodiments.

As shown in FIG. 1, the method of detecting deadlock in a multithread program according to the exemplary embodiments includes the following steps. In step S100, a user selects a thread to be detected. Then, in step S101, a tracking program is initiated in order to track the thread running in the kernel. Then in step S102, a target multithread program is initiated. At this time, the target program is an application program running in the user space. The detection of the application program in the user space differs from detection in the kernel space in that the kernel is always loaded in the physical memory, and has a fixed address. Thus, the detection probes can be inserted at any time.

While the application program in the user space is loaded into the internal memory, as required, and does not have a fixed address, the probes cannot be inserted at any time. The method for resolving whether deadlock has occurred includes maintaining a predetermined list of probes, inserting a probe into the kernel function do_page_fault, and acquiring information of the loaded page from the function of do_page_fault. The list of probes is checked when do_page_fault returns, and if it is determined that a thread which needs to be inserted in a probe exists, a probe is inserted in the newly loaded page.

That is, when initiating the target program, the initiated program will be loaded to be run in the kernel. At this time, a page fault is generated. Therefore, in step S103, the user makes a judgment as to whether the thread selected by the user is running according to the page fault. When the thread selected by the user is run, then step S104 is performed. In step S104, a probe is dynamically inserted into the database to detect the thread selected by the user, by using the instrument function.

Figure 2:
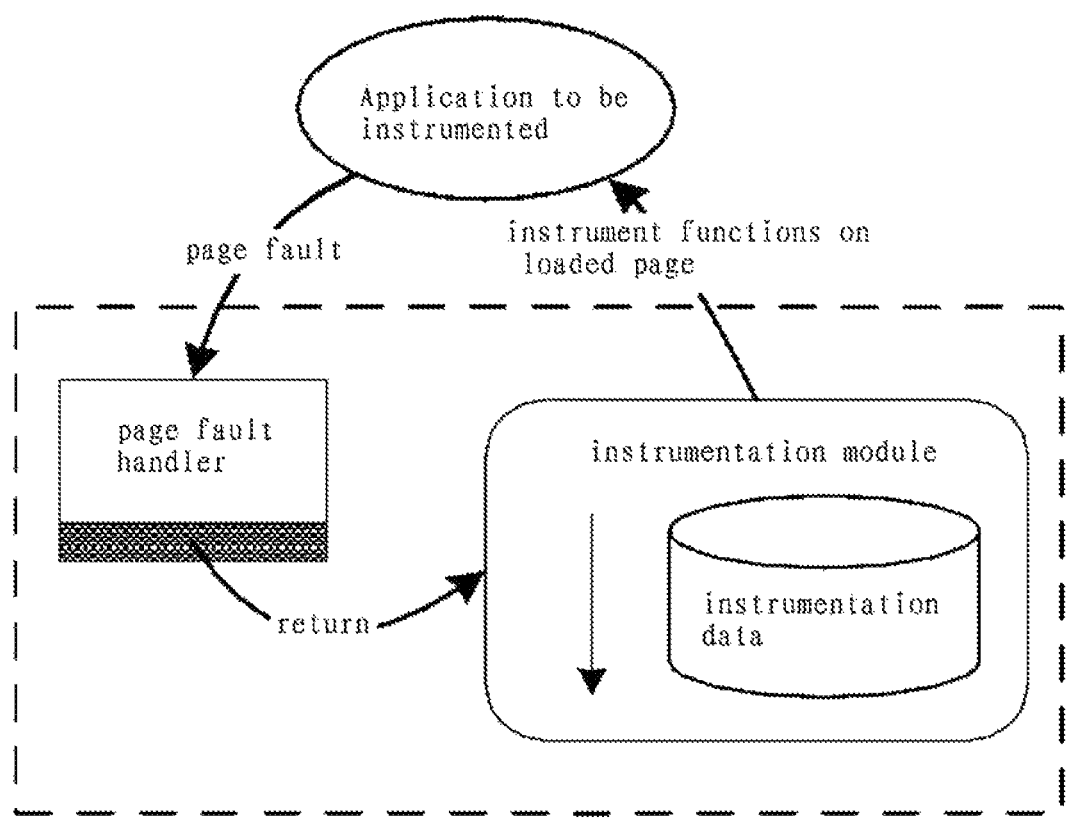
FIG. 2 is a brief schematic diagram of a method for dynamic inserting a user space according to the exemplary embodiments.

FIG. 2 is a brief schematic diagram of a method for dynamically inserting a probe into a user space according to the exemplary embodiments. Referring to FIG. 2, it can be understood that since the application program of the user space is different from the kernel program, it is not loaded into the internal memory once, and is selectively loaded when running. Therefore, when a user sets dynamic detection instructions, the instructions will be recorded in the detected data. When a page fault occurs, the page fault handler will communicate with an instrumentation module, and the instrumentation module detects whether the newly loaded application program needs to insert the instrument function. When needed, the instrument function is inserted dynamically.

The method for dynamically inserting probes is carried out in the following manner. Kprobes are used by the method for dynamically inserting probes in the present invention. The details of the manner of insertion manner are: an interrupt instruction is inserted in the place where a probe needs to be inserted. When performing the interrupt instruction, the corresponding interrupt function is accessed, and the instrument function defined by the user is performed in the interrupt function. Kprobes write a break-point instruction at the given address in the running kernel, and insert an instrument function. However, performing the instruction for the detection will cause break-point error, and Kprobes hook in a break-point handler and collect the debug information.

The manner of detection of the instrument function provides two types of detection: one is entry detection, and the other is return detection. The entry detection is performed when the resource function is entered, and the return detection is performed when the resource function is returned, and the number of the thread and the mark of the resource are recorded. Therefore, the instrument function is inserted at the entry and the return of the resource function.

Then, step S105 is performed, the instrument function records the detected data. When the target program is initiated, the resource request function and the resource release function are accessed. At this time, the corresponding entry instrument function and the return instrument function are accessed, and the number of the thread and the mark of the resource will be recorded.

Therefore, the number of the thread and the mark of the resource are included in the data detected by the instrument function. The resource request function includes a resource request entry function and a resource request return function.

The resource release function includes a resource release entry function and a resource release return function. When a thread enters into the resource request function, such as pthread_mutex_lock, which means that the thread is requesting a resource. When the return from pthread_mutex_lock is successful, this means that the thread which acquired the resource was successful and the period between entering the function and returning to the function is the time for the thread to acquire the resource. The thread entering into pthread_mutex_unlock, which means that the thread starts to release the resource, and the return from pthread_mutex_unlock success, which means that the thread was successful in releaseing the resource. At this time, other threads can use the resource released by the thread. This is in contrast to the situation where a thread continues occupying a certain resource, such that other threads cannot use the resource.

Step S106 is performed to make a judgment as to whether the data recorded by the instrument function goes beyond a threshold value. When the data recorded by the instrument function goes beyond the threshold value, step S107 is performed in order to move the recorded data to the user space. At this time, the threshold value is the threshold value in the kernel space. Since the kernel space is limited, the data recorded in the instrument function cannot be stored in the buffer area of the internal memory forever. When the recorded data goes beyond a certain threshold value, the data will be transmitted to the user space, stored therein in the disc or database system, and the corresponding kernel data will be emptied, since kernel space is limited.

The threshold value is determined according to the size of the internal memory, and this value cannot be too large. If the size of the internal memory is too large, the running of the kernel will be affected. The threshold value cannot be too small either, otherwise the performance of the kernel can also be adversely affected since the data is frequently transmitted to the user space. For reference, 32 MB of buffer can be allocated in the case of the internal memory of 1 G.

When step S108 is performed, the data recorded by the instrument function, which is transmitted to the user space, is analyzed to make a judgment as to whether deadlock has been generated.

Figure 3:
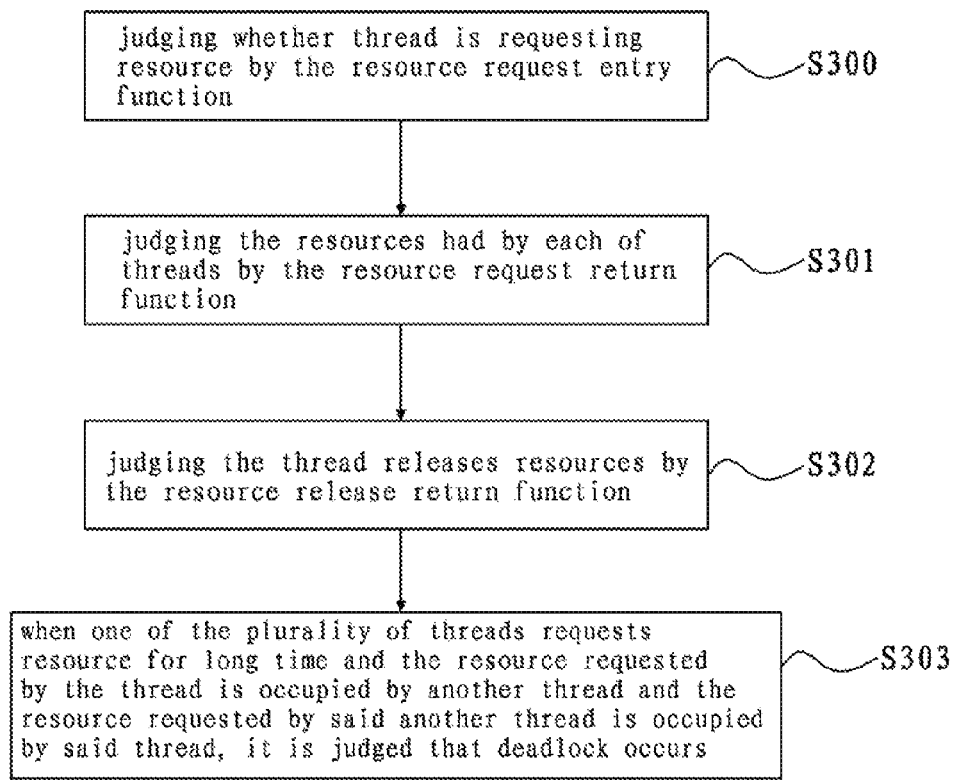
FIG. 3 is a flowchart of an analysis method for deadlock detection according to the exemplary embodiments.
Figure 4:
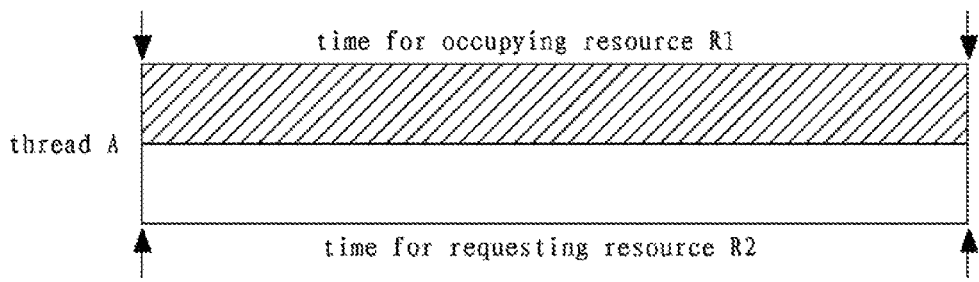
FIG. 4 is a brief schematic diagram of the deadlock state in FIG. 3.
Figure 4:
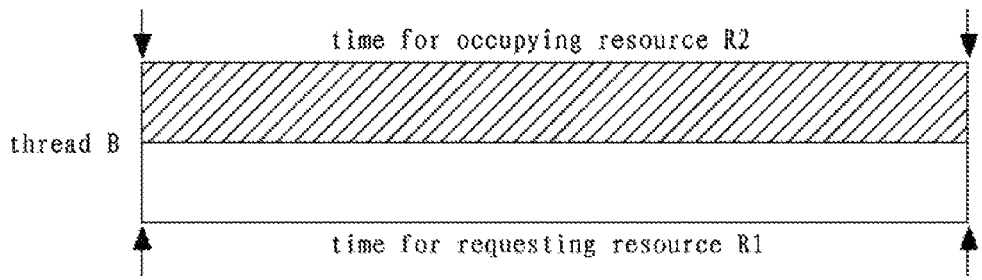

FIG. 3 is a flowchart of an analysis method for detecting deadlock according to the exemplary embodiments. FIG. 4 is a brief schematic diagram of the deadlock state in FIG. 3. By referring to the figures, it can be understood that the analysis method of the present invention is as follows: in step S301, a judgment is made as to whether each of the threads is requesting a resource through the resource request entry function. Step S302 is performed to make a judgment as to the resources had by each of threads by the resource request return function. Then step S303 is performed in order to make a judgment as to whether each of threads releases all occupied resources, using the resource release entry function and the resource release return function.

When Step S304 is performed, deadlock analysis is performed according to the number of the thread and the mark of the resource, detected by the instrument function. That is, when one of the plurality of threads occupies one resource for a long time and does not release the resource, and the same thread requests another resource, and said another resource requested by the thread is occupied by another thread for long time, and said another thread does not release said another resource, a judgment is made that deadlock has occurred. In FIG. 4, thread A occupies resource R1 for long time, and requests resource R2 at the same time. Meanwhile, thread B occupies resource R2 for long time and requests resource R1. In this situation, a judgment is made that deadlock has occurred.

Figure 5:
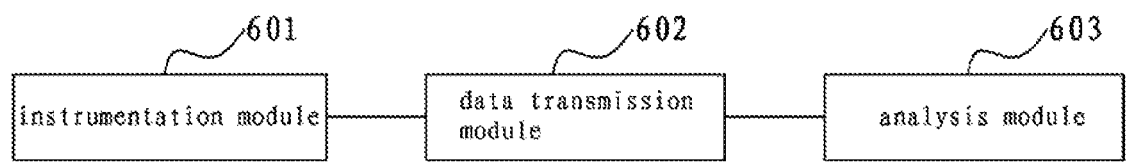
FIG. 5 is a block diagram of a system for detecting deadlock in the multithread program according to the exemplary embodiments.

FIG. 5 is a block diagram of a system for detecting deadlock in the multithread program according to the exemplary embodiments. It can be understood from the figure that the system for detecting deadlock in the multithread program according to the exemplary embodiments includes instrumentation module 600, data transmission module 601, and analysis module 602. Instrumentation module 600 is used for dynamically inserting a probe into the database to detect the thread selected by the user through the instrument function, and record data in the instrument function. Moreover, instrumentation module 600 can also set the instrument function of the kernel space. In the exemplary embodiments, instrumentation module 600 inserts the probe dynamically by using kprobes, and the detailed manner of inserting the probe is: an interrupt instruction is inserted in the place where a probe is needed to be inserted, and when performing the interrupt instruction, the corresponding interrupt function is accessed, and the instrument function defined by the user is performed in the interrupt function.

Kprobes write a break-point instruction at the given address in the running kernel, and insert an instrument function. However, performing the instruction for the detection of deadlock will cause a break-point error. Kprobes hook into a break-point handler and collect the debug information.

The detection type of the instrument function includes both the entry detection and the return detection. The entry detection is performed when the resource function is entered, and the return detection is performed when the resource function is returned. The instrument function records the number of the thread and the mark of the resource. Data transmission module 601 is used for transmitting data to the user space, which is to be stored when the recorded data goes beyond a threshold value of the kernel. At this time, the threshold value is determined according to the size of the internal memory. The threshold value cannot be too large. If it is too large, the running of the kernel will be affected. The threshold value also cannot be too small. If it is too small, the performance of the kernel can also be affected since the data is transmitted to the user space frequently.

For reference, 32 MB of buffer can be allocated in the situation of an internal memory of 1 G. Analysis module 602 is used to analyze the user space data in order to make a judgment as to whether deadlock has been generated. Analysis module 602 performs analysis through comparing the number of the thread and the mark of the resource detected by the instrument function. That is, when one of the plurality of threads occupies one resource for a long time and does release the resource, at the same time the thread requests another resource, and said another resource requested by the thread is occupied by another thread for a long time and said another thread does not release said another resource, analysis module 602 makes a judgment that deadlock has occurred.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope of the claims will be construed as being included in the exemplary embodiments of the present invention.

What is claimed is:

1. A method for detecting deadlock in a target multithread program, the method comprising:
   selecting a thread in the target multithread program to be detected;
   initiating a tracking program which tracks the thread running in a kernel;
   initiating the target multithread program;
   judging whether the selected thread is running;
   dynamically inserting the probe into a database to detect the selected thread through an instrument function if it is judged that the selected thread is running;
   recording data detected by the instrument function;
   when a size of the recorded data is equal to or greater than a threshold size of the kernel, transmitting the data to a user space and storing the data in the user space; and
   analyzing the data stored in the user space to judge whether deadlock has been generated.

2. The method of claim 1, wherein the data is detected through entry detection and return detection, where the entry detection is performed when a resource function is entered and the return detection is performed when the resource function is returned.

3. The method of claim 2, wherein the recording the data detected by the instrument function comprises recording a number of the thread and a mark of a resource.

4. The method of claim 1, wherein the analyzing the data stored in the user space comprises analyzing by comparing a number of the thread detected by the instrument function and a mark of a resource.

5. The method of claim 4, wherein, when one of a plurality of threads requests a resource for a predetermined period of time, the resource requested by the thread is occupied by another thread, and a resource requested by the another thread is occupied by said thread, it is judged that deadlock has occurred.

6. A system for detecting deadlock in a multithread program, the system comprising:

at least one processor which implements:
- an instrumentation module which dynamically inserts probes into a database to detect a thread through an instrument function, and which records data detected by the instrument function if it is judged that the thread is running;
- a data transmission module which transmits the recorded data and which stores the recorded data in a user space when the recorded data has a size equal to or greater than a threshold value of a kernel;
- an analysis module which analyzes the recorded data which is stored in the user space to judge whether deadlock has been generated.

7. The system of claim 6, wherein the instrument function detects the data through entry detection and return detection, where the entry detection is performed when a resource function is entered, and the return detection is performed when a resource function is returned.

8. The system of claim 7, wherein, the instrument function records a number of the thread and a mark of the resource.

9. The system of claim 6, wherein, the detection module performs analysis by comparing a number of the thread detected by the instrument function and a mark of the resource.

10. The system of claim 9, wherein, when one of a plurality of threads requests a resource for a predetermined period of time, the resource requested by the thread is occupied by another thread, and a resource requested by said another thread is occupied by said thread, it is judged that deadlock has occurred.

* * * * *